US011240387B2

(12) United States Patent
Karaki et al.

(10) Patent No.: US 11,240,387 B2
(45) Date of Patent: Feb. 1, 2022

(54) TERMINAL DEVICE, METHOD FOR CONTROLLING TERMINAL DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventors: Kenichi Karaki, Matsumoto (JP); Daiki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 34 days.

(21) Appl. No.: 16/918,371

(22) Filed: Jul. 1, 2020

(65) Prior Publication Data
US 2021/0006671 A1    Jan. 7, 2021

(30) Foreign Application Priority Data

Jul. 4, 2019 (JP) .............................. JP2019-124965

(51) Int. Cl.
| | |
|---|---|
| *H04N 1/00* | (2006.01) |
| *G06F 3/0481* | (2013.01) |
| *G06F 9/54* | (2006.01) |
| *H04N 1/32* | (2006.01) |
| *G06F 9/451* | (2018.01) |

(52) U.S. Cl.
CPC ..... *H04N 1/00395* (2013.01); *G06F 3/04817* (2013.01); *G06F 9/451* (2018.02); *G06F 9/543* (2013.01); *H04N 1/00474* (2013.01); *H04N 1/32529* (2013.01)

(58) Field of Classification Search
CPC ........... H04N 1/00395; H04N 1/32529; H04N 1/00474; G06F 3/04817; G06F 9/543; G06F 9/451; G06F 3/04845; G06F 3/0488
USPC ....................................................... 358/1.13
See application file for complete search history.

(56) References Cited

U.S. PATENT DOCUMENTS

| | | | |
|---|---|---|---|
| 2011/0072393 A1* | 3/2011 | Wilairat ................. | G06F 9/451 715/811 |
| 2018/0352068 A1 | 12/2018 | Asai | |
| 2019/0286396 A1* | 9/2019 | Kubo ..................... | G06F 3/1256 |

FOREIGN PATENT DOCUMENTS

JP    2018-205995 A    12/2018

* cited by examiner

*Primary Examiner* — Neil R McLean
(74) *Attorney, Agent, or Firm* — Workman Nydegger

(57) ABSTRACT

A terminal that can communicate with a multifunctional machine includes a touch panel and a terminal control unit that, by execution of a control application, causes the touch panel to display icons including a multifunctional machine icon such that the icons are arranged in a line and, when an icon selected by a selection operation is the multifunctional machine icon, calls a control function of a multifunctional machine application which corresponds to the multifunctional machine icon, and the terminal control unit causes the touch panel to display the icons such that a part of one icon of the icons is superimposed on the other icon adjacent to the one icon.

6 Claims, 7 Drawing Sheets

TERMINAL DEVICE, METHOD FOR CONTROLLING TERMINAL DEVICE, AND NON-TRANSITORY COMPUTER-READABLE STORAGE MEDIUM STORING PROGRAM

The present application is based on, and claims priority from JP Application Serial Number 2019-124965, filed Jul. 4, 2019, the disclosure of which is hereby incorporated by reference herein in its entirety.

BACKGROUND

1. Technical Field

The present disclosure relates to a terminal device, a method for controlling a terminal device, and a non-transitory computer-readable storage medium storing a program.

2. Related Art

Applications which cause a display unit to display an icon indicating a function of another callable application have been known. For example, JP-A-2018-205995 discloses a technology in which a mobile terminal in which an operation instruction program and a plurality of external programs that are applications have been installed displays a plurality of icons which indicate functions of the external programs using a function of the operation instruction program.

However, in an icon display mode described in JP-A-2018-205995, as the number of functions of one application and the number of callable applications increase, the number of icons that are displayed increases, so that an area in which the icons are displayed is widened. Therefore, in the icon display mode described in JP-A-2018-205995, a user cannot easily find a desired icon in some cases, and there is a probability that usability for the user is low.

SUMMARY

According to an aspect of the present disclosure, provided is a terminal device configured to communicate with a printing device, the terminal device including a display unit, and a control unit configured to, by execution of a first application, cause the display unit to display a plurality of icons including a first icon indicating a function of a second application which causes the printing device to execute processing such that the icons are arranged in a line and, when an icon selected by a selection operation from the icons is the first icon, call the function of the second application which corresponds to the first icon, the control unit being configured to cause the display unit to display the plurality of icons such that portions of adjacent ones of the icons are superimposed on each other.

In the above described terminal device, the control unit may be configured to cause the display unit to display the plurality of icons in a mode in which each of the plurality of icons is obliquely inclined with respect to an arrangement direction of the icons.

In the above described terminal device, the first application may have the function, and the plurality of icons may include a second icon indicating the function of the first application.

In the above described terminal device, the control unit may be configured to cause the display unit to display the plurality of icons corresponding to a type of the printing device that communicates with the terminal device.

According to another aspect of the present disclosure, provided is a method for controlling a terminal device that includes a display device and that is configured to communicate with a printing device, the method including, by execution of a first application, causing the display unit to display a plurality of icons including a first icon indicating a function of a second application such that the icons are arranged in a line and portions of adjacent ones of the icons are superimposed on each other, the second application causing the printing device to execute processing, and calling, when an icon selected by a selection operation from the icons is the first icon, the function of the second application which corresponds to the first icon.

According to still another aspect of the present disclosure, provided is a non-transitory computer-recordable storage medium storing a program that is executed by a control unit of a terminal device that includes a display unit and that is configured to communicate with a printing device, the program including causing the control unit to cause the display unit to display a plurality of icons including a first icon indicating a function of an application such that the icons are arranged in a line and portions of adjacent ones of the icons are superimposed on each other, the application causing the printing device to execute processing, and call, when an icon selected by a selection operation from the icons is the first icon, the function of the application which corresponds to the first icon.

DESCRIPTION OF EXEMPLARY EMBODIMENTS

Figure 1:
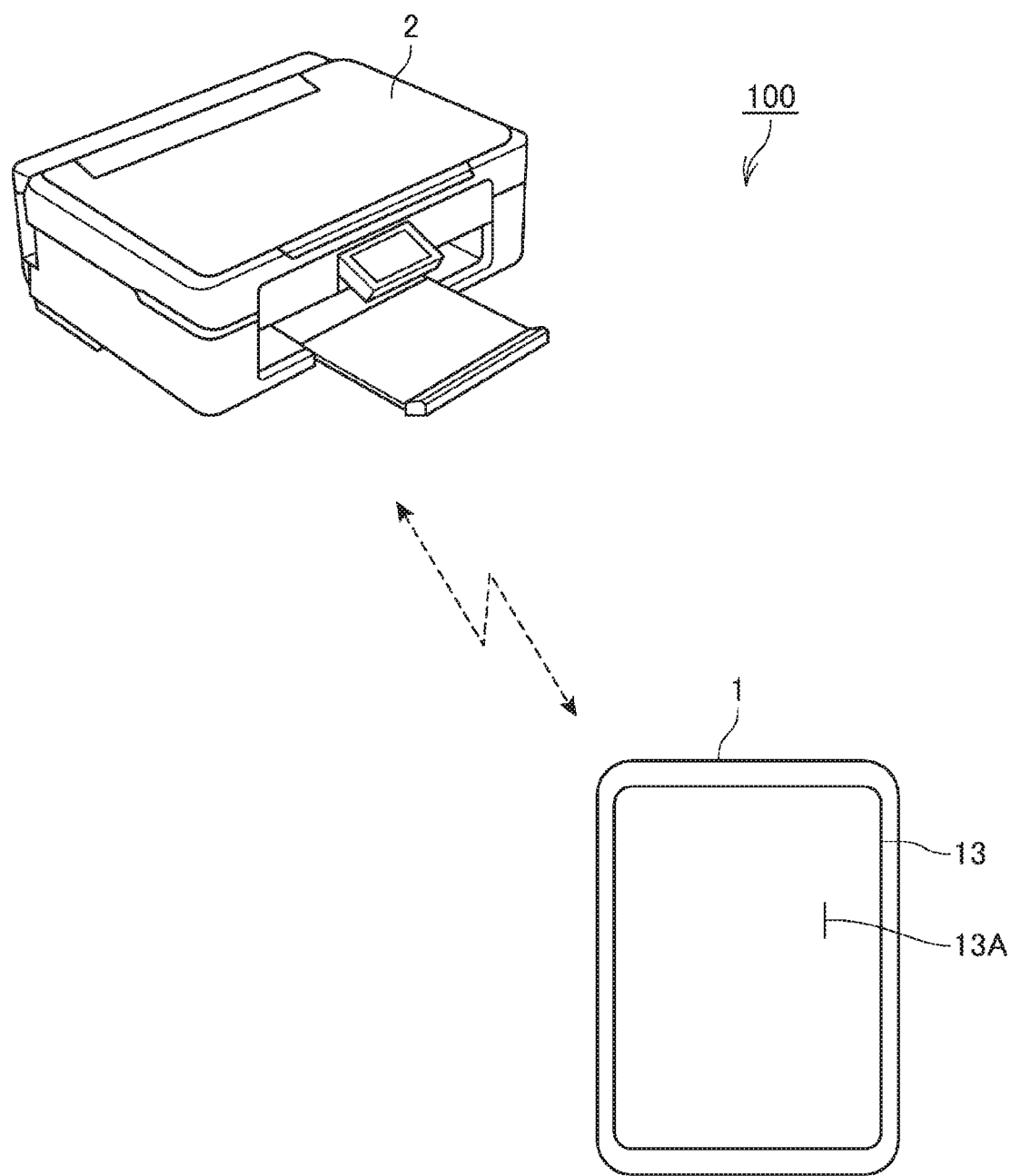
FIG. 1 is a view illustrating a configuration of a printing system.

FIG. 1 is a view illustrating a configuration of a printing system 100. The printing system 100 includes a terminal 1 and a multifunctional machine 2. The terminal 1 corresponds to an example of the terminal device. The multifunctional machine 2 corresponds to an example of the printing device.

The terminal 1 is, for example, a terminal device, such as a smartphone, a tablet, or the like, in which a touch panel 13 is provided in a front surface area. The terminal 1 functions as a control device that transmits control data to the multifunctional machine 2 to cause the multifunctional machine 2 to execute various types of processing using various application programs installed in advance. In the following description, an application program is briefly referred to as an app.

The multifunctional machine 2 is a device that is called a multi-function peripheral (MFP) and can execute various types of processing, such as printing, scanning, or the like. The multifunctional machine 2 executes various types of processing, based on control data received from the terminal 1, and also executes various types of processing, based on an operation performed by a user on an input unit, such as an operation switch, a touch panel, or the like, that is provided in the multifunctional machine 2.

The terminal 1 and the multifunctional machine 2 of this embodiment communicate with each other by a one-to-one communication method. Examples of this type of communication method include a direct communication method, such as Wi-Fi Direct or the like, in which devices communicate with each other via a wireless communication without going through an access point. "Wi-Fi" is a registered trademark. Note that a communication between the terminal 1 and the multifunctional machine 2 may be a wireless communication via Bluetooth or the like, and may be a wired communication, not limited to a wireless communication. Note that "Bluetooth" is a registered trademark. A communication method used for a communication between the terminal 1 and the multifunctional machine 2 may be a communication method by which a plurality of terminals 1 can communicate with one multifunctional machine 2. Examples of this type of communication method include, for example, an infrastructure communication method in which devices communicate with each other via a wireless communication via an access point.

Figure 2:
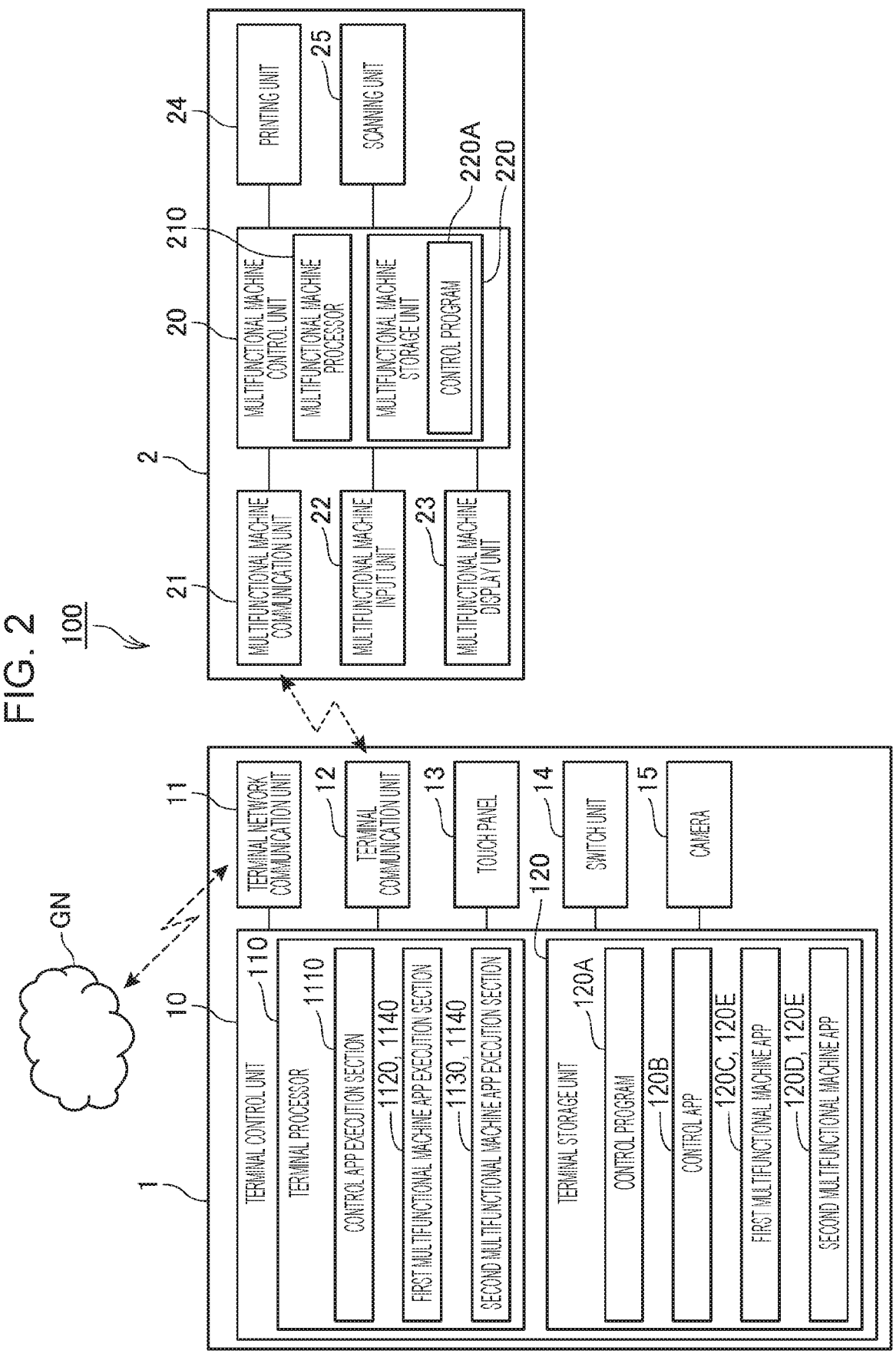
FIG. 2 is a block diagram illustrating configurations of a terminal and a multifunctional machine.

FIG. 2 is a block diagram illustrating configurations of the terminal 1 and the multifunctional machine 2. The terminal 1 includes a terminal control unit 10, a terminal network communication unit 11, a terminal communication unit 12, a touch panel 13, a switch unit 14, and a camera 15. The terminal control unit 10 corresponds to an example of the control unit. The touch panel 13 corresponds to an example of the display unit.

The terminal control unit 10 includes a terminal processor 110, such as a CPU, a MPU, or the like, that is a processor configured to execute a program and a terminal storage unit 120 and controls each unit of the terminal 1. The terminal control unit 10 executes various types of processing by cooperation of a hardware and a software such that the terminal processor 110 reads a control program 120A stored in the terminal storage unit 120 and executes processing. The terminal storage unit 120 corresponds to an example of the storage unit.

A control app 120B, a first multifunctional machine app 120C, and a second multifunctional machine app 120D are installed in the terminal 1 in advance. In the following description, when the first multifunctional machine app 120C and the second multifunctional machine app 120D are not distinguished from each other, each of the first multifunctional machine app 120C and the second multifunctional machine app 120D is referred to as a "multifunctional machine app" and denoted by the reference sign "120E." The control app 120B corresponds to an example of the first application and a program. The multifunctional machine app 120E corresponds to an example of the second application and an application.

The control app 120B is an app that is read from the terminal storage unit 120 and is executed by the terminal processor 110 to cause the terminal control unit 10 to function as a control app execution section 1110. The control app 120B is an app that can call the first multifunctional machine app 120C and the second multifunctional machine app 120D via a predetermined application programming interface (API). The control app 120B is an app having a function that causes the multifunctional machine 2 to execute processing. In the following description, the function that causes the multifunctional machine 2 to execute processing is referred to as a "control function." In this embodiment, a control function of the control app 120B is different from control functions of the first multifunctional machine app 120C and the second multifunctional machine app 120D. The control app execution section 1110 is described later.

The first multifunctional machine app 120C is an app having a control function that controls the multifunctional machine 2. In this embodiment, the control function of the first multifunctional machine app 120C is different from a control function of the second multifunctional machine app 120D. The first multifunctional machine app 120C is read from the terminal storage unit 120 and is executed by the terminal processor 110 to cause the terminal control unit 10 to function as a first multifunctional machine app execution section 1120. Details of the first multifunctional machine app execution section 1120 are described later.

The second multifunctional machine app 120D is an app having a control function that controls the multifunctional machine 2. The second multifunctional machine app 120D is read from the terminal storage unit 120 and is executed by the terminal processor 110 to cause the terminal control unit 10 to function as a second multifunctional machine execution section 1130. Details of the second multifunctional machine execution section 1130 are described later.

In the following description, when the first multifunctional machine app execution section 1120 and the second multifunctional machine execution section 1130 are not distinguished from each other, each of the first multifunctional machine app execution section 1120 and the second multifunctional machine execution section 1130 is referred to as a "multifunctional machine app execution section" and denoted by the reference sign "1140."

The terminal storage unit 120 has a storage area in which a program that is executed by the terminal processor 110 or data that is processed by the terminal processor 110 is stored. The terminal storage unit 120 stores the control program 120A, the control app 120B, the first multifunctional machine app 120C, the second multifunctional machine app 120D that are executed by the terminal processor 110, and other various types of data. The terminal storage unit 120 has a nonvolatile storage area in which a program or data is stored in a nonvolatile manner. The terminal storage unit 120 may be configured to have a volatile storage area and form a work area in which a program that is executed by the terminal processor 110 or target data that is to be processed is temporarily stored.

The terminal network communication unit 11 includes a communication hardware in compliance with a predetermined communication standard and communicates with a device coupled to a global network GN in compliance with the predetermined communication standard in accordance with control performed by the terminal control unit 10.

The terminal communication unit 12 is formed of a communication hardware in compliance with a predetermined communication standard and communicates with the multifunctional machine 2 in compliance with the predetermined communication standard in accordance with control performed by the terminal control unit 10.

The touch panel 13 includes a display panel, such as a liquid crystal display panel or the like, and a touch sensor that is provided so as to overlap the display panel or to be unified with the display panel. The display panel displays various images in accordance with control of the terminal control unit 10. The touch sensor detects a touch operation and outputs the detected touch operation to the terminal control unit 10. The terminal control unit 10 executes processing corresponding to the touch operation, based on an input from the touch sensor.

The switch unit 14 includes an operator, such as a switch or the like, that is provided in a case and outputs a signal corresponding to an operation performed on the switch or the like to the terminal control unit 10. The terminal control unit 10 executes processing corresponding to the operated operator, based on the signal input from the switch unit 14.

The camera 15 executes photographing in accordance with control performed by the terminal control unit 10 and outputs photographic image data indicating a photographic image to the terminal control unit 10.

The multifunctional machine 2 includes a multifunctional machine control unit 20, a multifunctional machine communication unit 21, a multifunctional machine input unit 22, a multifunctional machine display unit 23, a printing unit 24, and a scanning unit 25.

The multifunctional machine control unit 20 includes a multifunctional machine processor 210, such as a CPU, a MPU, or the like, that is a processor configured to execute a program and a multifunctional machine storage unit 220 and controls each unit of the multifunctional machine 2. The multifunctional machine control unit 20 executes various types of processing by cooperation of a hardware and a software such that the multifunctional machine processor 210 reads a control program 220A stored in the multifunctional machine storage unit 220 and executes processing.

The multifunctional machine storage unit 220 has a storage area in which a program that is executed by the multifunctional machine processor 210 or data that is processed by the multifunctional machine processor 210 is stored. The multifunctional machine storage unit 220 stores the control program 220A that is executed by the multifunctional machine processor 210 and other various types of data. The multifunctional machine storage unit 220 has a nonvolatile storage area in which a program or data is stored in a nonvolatile manner. The multifunctional machine storage unit 220 may be configured to have a volatile storage area and form a work area in which a program that is executed by the multifunctional machine processor 210 or target data that is to be processed is temporarily stored.

The multifunctional machine communication unit 21 includes a communication hardware in compliance with a predetermined communication standard and communicates with the terminal 1 in compliance with the predetermined standard in accordance with control performed by the multifunctional machine control unit 20.

The multifunctional machine input unit 22 includes an input unit, such as an operation switch, a touch panel, or the like, that is provided in the multifunctional machine 2, detects an operation performed on the input unit by the user, and outputs the detected operation to the multifunctional machine control unit 20. The multifunctional machine control unit 20 executes processing corresponding to the operation performed on the input unit, based on an input from the multifunctional machine input unit 22.

The multifunctional machine display unit 23 includes a plurality of LEDs, a display panel, or the like and executes lighting-on, lighting-off, and flickering of the LEDs in a predetermined mode, display of information on the display panel, or the like in accordance with control performed by the multifunctional machine control unit 20.

The printing unit 24 includes components, such as an ink jet head that ejects inks to a print medium to form dots thereon, a carriage that causes the ink jet head to operate in a scanning direction, a carriage drive motor that drives the carriage, a transport unit that transports the print medium, an ink supply unit that supplies an ink to the ink jet head, or the like, that are related to printing. The printing unit 24 forms dots on a print surface of the print medium that is transported by ejecting inks from nozzles of the ink jet head to perform printing on the print medium in accordance with control performed by the multifunctional machine control unit 20.

The scanning unit 25 includes components, such as a scanner that reads a character or an image recorded on an original document, or the like, that are related to reading. The scanning unit 25 reads the recorded character or image, for example, by irradiating the original document with light emitted by a light source and outputs image data obtained by reading to the multifunctional machine control unit 20. The multifunctional machine control unit 20 performs data processing, such as RGB conversion, compression processing, or the like, on the image data input from the scanning unit 25 and generates data in a predetermined format. The multifunctional machine control unit 20 causes the multifunctional machine storage unit 220 to store the generated data in the predetermined format.

Next, a function of the control app 120B is described. When the user starts the control app 120B installed in the terminal 1, the terminal control unit 10 reads the control app 120B from the terminal storage unit 120, executes the control app 120B, and thus, functions as the control app execution section 1110.

The control app execution section 1110 causes the touch panel 13 to display an image of a control app user interface 30. In the following description, "user interface" is abbreviated to "UI." Accordingly, in the following description, the "control app user interface 30" is briefly referred to as a "control app UI 30."

Figure 3:
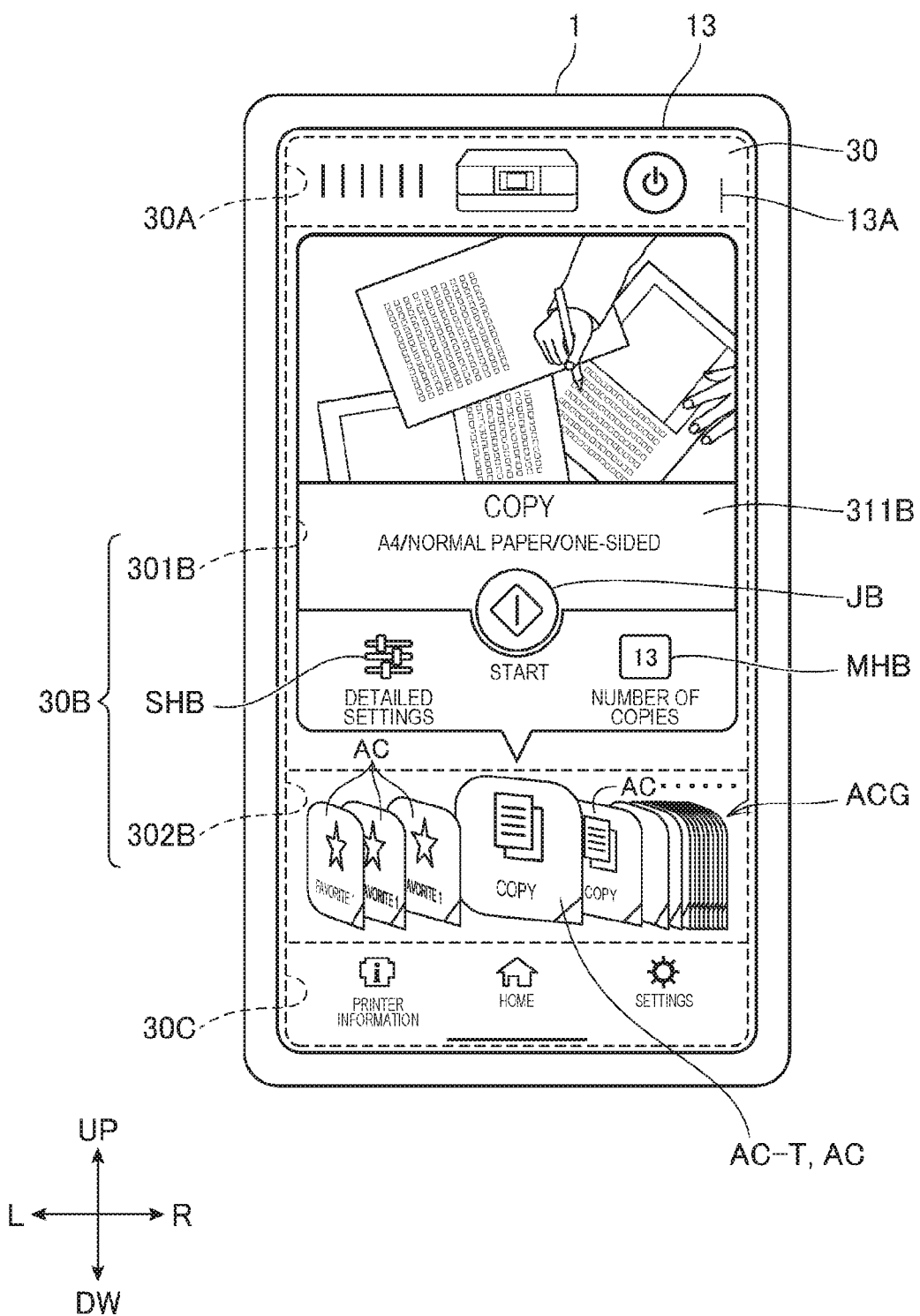
FIG. 3 is a view illustrating an example of a control app user interface (UI).

FIG. 3 is a view illustrating an example of the control app UI 30. The control app UI 30 illustrated in FIG. 3 indicates a case in which a control icon AC-T is operated by a touch operation by the user. Herein, the "control icon AC-T" is an icon AC indicating the control function of the control app 120B. Note that a tap operation is a touch operation that is made by lightly tapping a display surface 13A of the touch panel 13, that is, a touch operation in which an operator, such as a finger F or the like, is removed from the display surface 13A of the touch panel 13 immediately after the operator touches the display surface 13A. The tap operation is also briefly referred to as a tap.

In FIG. 3, a direction toward an upper side is referred to as "up" and denoted by the reference sign UP, a direction toward a lower side is referred to as "down" and denoted by a reference sign DW, a direction toward a left side is referred to as "left" and denoted by a reference sign L, and a direction toward a right side is referred to as "right" and denoted by a reference sign R.

As illustrated in FIG. 3, the control app UI 30 has a multifunctional machine information display area 30A, an icon related display area 30B, and a UI transition operation area 30C.

The multifunctional machine information display area 30A is an area used for displaying a multifunctional machine information display UI that is an UI that displays information for the multifunctional machine 2. The control app execution section 1110 receives a touch operation of the user in the multifunctional machine information display area 30A and causes the UI that the touch panel 13 is caused to display to transition from the control app UI 30 to the multifunctional machine information display UI in accordance with the received touch operation. Examples of information for the multifunctional machine 2 displayed by the multifunctional machine information display UI include information indicating an ink residual amount of the multifunctional machine 2, information indicating a storable amount of a waste liquid box in which inks that are discharged as waste liquid at the time of maintenance of the ink jet head are stored, or the like. Note that, when the control app execution section 1110 causes the touch panel 13 to display the multifunctional machine information display UI, the control app execution section 1110 acquires information for the multifunctional machine 2 from the multifunctional machine 2 by a predetermined method.

The UI transition operation area 30C is an area used for causing the UI displayed on the touch panel 13 to transition to any one of the control app UI 30, the multifunctional machine information display UI, and an app setting UI in accordance with the touch operation of the user. The app setting UI is a UI that displays information for settings of the control app 120B.

The icon related display area 30B has a function explanation area 301B and an icon display area 302B. First, the icon display area 302B is described.

The icon display area 302B is provided below the function explanation area 301B in the icon related display area 30B. In the icon display area 302B, an icon group ACG formed by a plurality of icons AC arranged in a line in a left-right direction is displayed.

The plurality of icons AC that form the icon group ACG are described below. In this embodiment, the plurality of icons AC that form the icon group ACG include the control icon AC-T, a first multifunctional machine icon AC-F1, and a second multifunctional machine icon AC-F2. The control icon AC-T corresponds to an example of the second icon. Each of the first multifunctional machine icon AC-F1 and the second multifunctional machine icon AC-F2 corresponds to an example of the first icon. In the following description, when the first multifunctional machine icon AC-F1 and the second multifunctional machine icon AC-F2 are not distinguished from each other, each of the first multifunctional machine icon AC-F1 and the second multifunctional machine icon AC-F2 is referred to as a "multifunctional machine icon" and denoted by the reference sign "AC-F."

The control icon AC-T is an icon AC that indicates the control function of the control app 120B. In this embodiment, the control app 120B has a copy function as the control function. The copy function is a function that causes the multifunctional machine 2 to execute copying.

The first multifunctional machine icon AC-F1 is an icon AC that indicates the control function of the first multifunctional machine app 120C. In this embodiment, the first multifunctional machine app 120C has, as control functions, a photoprint function, a document print function, a cloud print function, a scan function, and a camera copy function.

The photo print function is a function that causes the multifunctional machine 2 to print a photographic image obtained by the camera 15 of the terminal 1. The document print function is a function that causes the multifunctional machine 2 to print, based on a text data in a predetermined format stored in the storage area, such as the terminal storage unit 120 or the like, of the terminal 1, a text indicated by the text data. The cloud print function is a function that causes the multifunctional machine 2 to print, based on image data, text data, or the like stored by a device coupled to the global network GN, an image, a text, or the like. The scan function is a function that causes the multifunctional machine 2 to execute scanning. The camera copy function is a function that cuts out an image in a range designed by the user from the photographic image of the camera 15 of the terminal 1, performs distortion correction on the cut-out image, and causes the multifunctional machine 2 to print the image on which distortion correction has been performed.

The second multifunctional machine icon AC-F2 is an icon AC that indicates the control function of the second multifunctional machine app 120D. In this embodiment, the second multifunctional machine app 120D has, as control functions, a collage print function, a disk label print function, a coloring book print function, a form print function, a handwriting composition sheet function, a photobook print function, and a design paper print function.

The collage print function is a function that causes the multifunctional machine 2 to print one image formed by combining a plurality of images stored by the terminal 1. The disk label print function is a function that causes the multifunctional machine 2 to print an image stored by the terminal 1 on a label surface of a disk, such as a compact disc (CD), a digital versatile disc (DVD), a Blu-ray (BD) (a registered trademark) Disc, or the like. The coloring book print function is a function that converts an image stored by the terminal 1 to an image in which only an outline of a subject is left by a predetermined method and causes the multifunctional machine 2 to print the converted image. The form print function is a function that causes the multifunctional machine 2 to output a printed material on which a predetermined form, such as a ruled line or the like, is printed. The handwriting composition sheet function is a function that superimposes a handwritten image input by the user on an image stored by the terminal 1 and causes the multifunctional machine 2 to print the superimposed image. The photobook print function is a function that causes the multifunctional machine 2 to output a printed material corresponding to a page forming a photobook, based on an image stored by the terminal 1. The design paper print function is a function that causes the multifunctional machine 2 to execute design paper printing in which a pattern determined in advance is printed.

In this embodiment, in the icon group ACG, a fourth icon AC from the left is a control icon AC-T indicating the copy function. In this embodiment, in the icon group ACG, a fifth icon AC from the left to a ninth icon AC from the left are the first multifunctional machine icons AC-F1 indicating the photo print function, the document print function, the cloud print function, the scan function, and the camera copy function in order. In this embodiment, in the icon group ACG, a tenth icon AC from the left to a sixteenth icon AC from the left are the second multifunctional machine icons AC-F2 indicating the collage print function, the disk label print function, the coloring book print function, the form print function, the handwriting composition sheet function, the photobook print function, and the design paper print function in order. Note that, in the icon group ACG, the first to third icons AC from the left, that is, the icons AC with a text "FAVORITE 1" in FIG. 3, are icons AC a type of each of which can be set to one of the control icon AC-T and the multifunctional machine icon AC-F. This icon AC may not be included in the icon group ACG.

Figure 4:
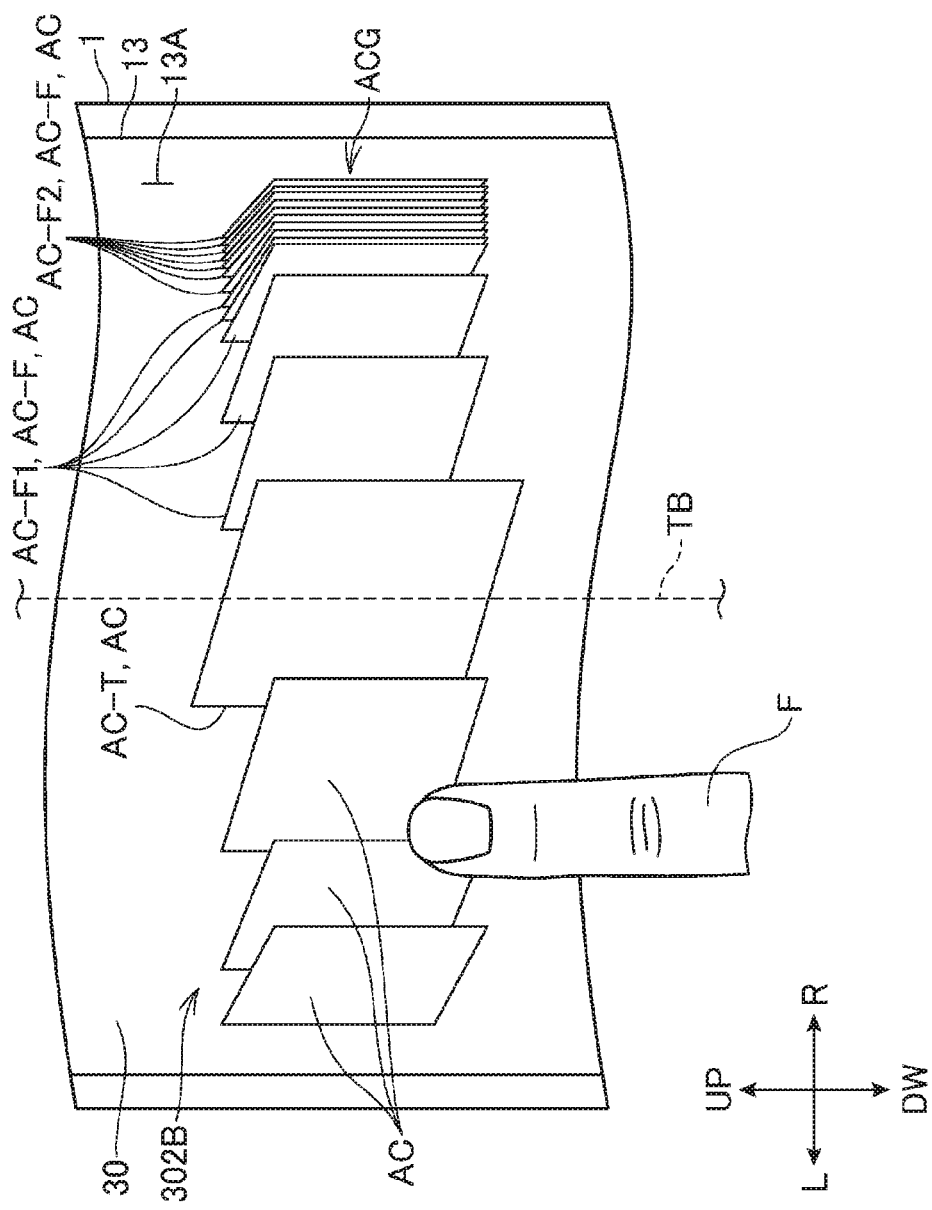
FIG. 4 is a view illustrating an example of an icon display area.
Figure 5:
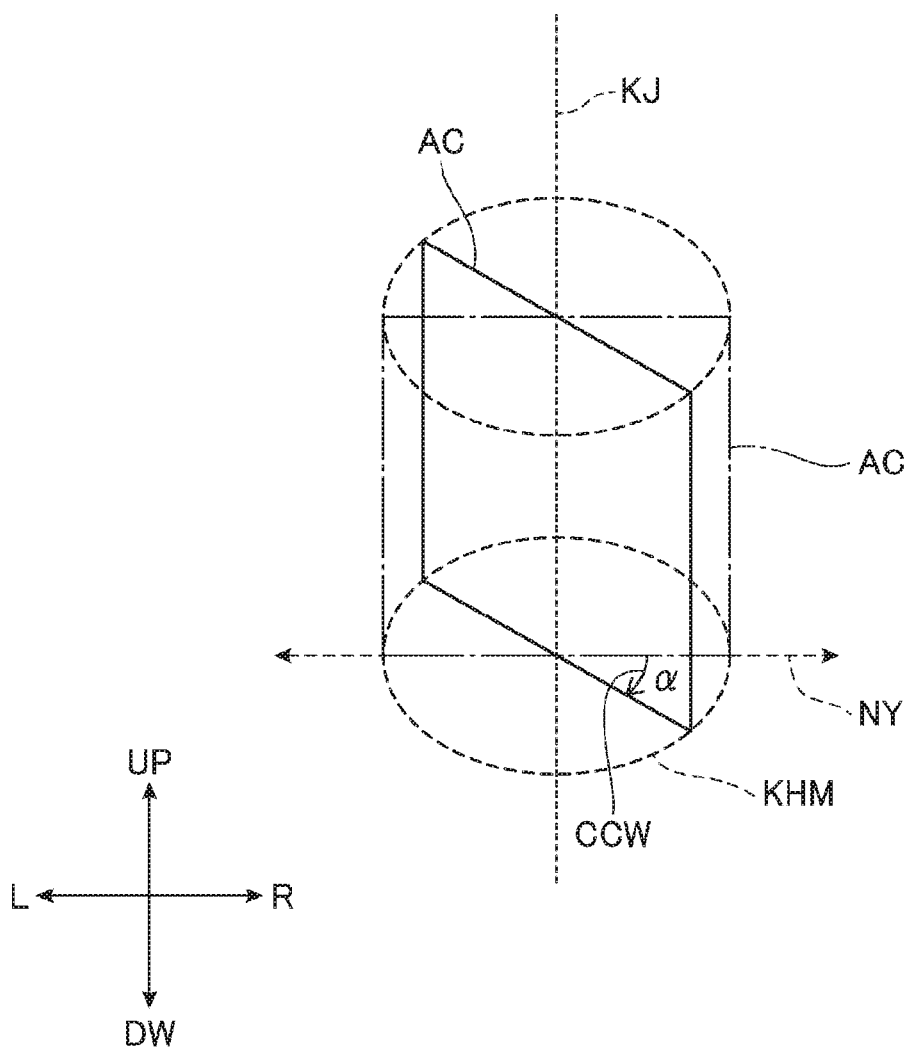
FIG. 5 is a view used for explaining image processing of a control app execution section.

FIG. 4 is a view illustrating an example of the icon group ACG in the icon display area 302B. FIG. 5 is a view used for explaining image processing of the icon AC by the control app execution section 1110. In FIG. 4, for convenience of description, the finger F of the user as an operator for the touch panel 13 is illustrated as well. Note that, in FIG. 4 and FIG. 5, icons AC each having a shape corners of which are not rounded are illustrated.

In FIG. 4 and FIG. 5, similar to FIG. 3, a direction toward an upper side is referred to as "up" and denoted by the reference sign UP, a direction toward a lower side is referred to as "down" and denoted by a reference sign DW, a direction toward a left side is referred to as "left" and denoted by a reference sign L, and a direction toward a right side is referred to as "right" and denoted by a reference sign R.

As illustrated in FIG. 4, the plurality of icons AC that form the icon group ACG are displayed in the icon display area 302B such that the icons AC are arranged in a line in the left-right direction and portions of adjacent ones of the icons AC are superimposed on each other.

As illustrated in FIG. 4, each of the plurality of icons AC is displayed in the icon display area 302B so as to stand vertically with respect to a virtual horizontal plane KHM and be viewed as an overhead view from a predetermined view point. That is, each of the plurality of icons AC is displayed in the icon display area 302B in a mode in which an up-down direction that is perpendicular to the left-right direction that is an arrangement direction NY of the icons AC is a rotation axis KJ and the icon AC rotates at a predetermined rotation angle α with the rotation axis KJ centered using the arrangement direction NY as a reference. That is, each of the plurality of icons AC is displayed in the icon display area 302B in a mode that the each icon AC obliquely inclined with respect to the arrangement direction NY of the icons AC.

As illustrated in FIG. 5, the control app execution section 1110 performs image processing of changing the shape of the icon AC on each of the plurality of icons AC that form the icon group ACG to achieve display in a mode in which the each icon AC rotates at the predetermined rotation angle α with the corresponding rotation axis KJ centered. In FIG. 5, an icon AC indicated by alternate long and short dashes lines is the icon AC before the shape thereof is changed, and an icon AC indicated by solid lines is the icon AC after the shape thereof is changed.

The control app execution section 1110 performs image processing on each of the plurality of icons AC to achieve display in a mode in which the each icon AC is rotated at the rotation angle α described below. That is, the control app execution section 1110 performs image processing on an icon AC located in a central portion TB in the left-right direction of the icon display area 302B to achieve display in a mode in which the icon AC is rotated at the rotation angle α that is smaller than the rotation angles α of the other icons AC. The control app execution section 1110 performs image processing on the other icons AC than the icon AC located in the central portion TB to achieve display in a mode in which the rotation angle α increases as each of distances from the central portion TB to left and to right increases. Note that each of the icons AC is image-processed to achieve display in a mode in which the each icon AC is rotated at the rotation angle α with which an area used for displaying icons AC reduces as a distance from the central portion TB in the left-right direction increases. That is, in FIG. 5, when it is assumed that the arrangement direction NY of the icons AC is 0 degrees and a direction indicated by the arrow CCW is a positive direction, the control app execution section 1110 performs image processing to achieve display in a mode in which the icon AC is rotated at the rotation angle α in a range 0 degrees<α<+90 degrees.

As illustrated in FIG. 4, each of the plurality of icons AC is displayed in the icon display area 302B such that a space between adjacent ones of the icons AC reduces as each of the distances from the central portion TB of the icon display area 302B to left and to right increases.

In the icon display area 302B, a predetermined touch operation is performed by the user, and thus, a display mode of the icons AC that form the icon group ACG changes. In this embodiment, as the predetermined touch operation, a slide operation is described as an example. Note that the slide operation herein is a touch operation in which the display surface 13A of the touch panel 13 is moved as being touched.

With reference to FIG. 4, it is described below that the display mode of the icons AC changes due to the slide operation. When a slide operation to right is performed by the finger F in the icon display area 302B, the control app execution section 1110 moves the icons AC one by one from left to right in accordance with an amount of move of the finger F to right in the display surface 13A to change the display mode of the icon group ACG. In this case, while the control app execution section 1110 superimposes portions of adjacent ones of the icons AC on each other and performs image processing on each of the icons AC to achieve display in a mode in which the each icon AC is rotated at the rotation angle α corresponding to a position thereof in the left-right direction, the control app execution section 1110 moves the icons AC one by one from left to right. As the number of times the user has performed the slide operation to right increases, the number of the icons AC that move to right increases, and thus, in a right side of the icon display area 302B, many of the icons AC are arranged such that a space between adjacent ones of the many of the icons AC reduces.

On the other hand, when a slide operation to left is performed by the finger F in the icon display area 302B, the control app execution section 1110 moves the icons AC one by one from right to left in accordance with an amount of move of the finger F to left in the display surface 13A to change the display mode of the icon group ACG. In this case, while the control app execution section 1110 superimposes portions of adjacent ones of the icons AC on each other and performs image processing on each of the icons AC to achieve display in a mode in which the each icon AC is rotated at the rotation angle α corresponding to a position thereof in the left-right direction, the control app execution section 1110 moves the icons AC one by one from right to left. As the number of times the user has performed the slide operation to left increases, the number of the icons AC that move to left increases, and thus, in a left side of the icon display area 302B, many of the icons AC are arranged such that a space between adjacent ones of the many of the icons AC reduces.

As described above, the control app execution section 1110 causes the touch panel 13 to display, in the icon display area 302B, the plurality of icons AC including the multifunctional machine icons AC-F such that the icons AC are arranged in a line and portions of adjacent ones of the plurality of icons AC are superimposed on each other. Thus, even when many icons AC corresponding to the number of the multifunctional machine apps 120E installed in the terminal 1 and the number of control functions of the multifunctional machine app 120E are displayed, a situation in which an display area in which the icons AC are displayed is wider than the icon display area 302B and the plurality of icons AC cannot be displayed on one screen can be avoided, so that the user can easily find a desired icon AC. Moreover, increase in the display area of the icons AC to a wide area can be suppressed, so that the user can easily know where the desired icon AC is located. Therefore, the terminal 1 can display icons in a user-friendly manner.

The control app execution section 1110 causes the touch panel 13 to display the plurality of icons AC including the multifunctional machine icons AC-F in the icon display area 302B in a mode in which each of the plurality of icons AC is obliquely inclined with respect to the arrangement direction NY of the icons AC. Thus, an area used for displaying one icon AC can be reduced and increase in the display area in which the plurality of ions AC are displayed to a wide area can be further suppressed. Therefore, the terminal 1 can display icons in a more user-friendly manner.

With reference to FIG. 3, a screen related to an icon AC selected from the plurality of icons AC displayed in the icon display area 302B by a touch operation is displayed in the function explanation area 301B. In the following description, the screen that is displayed in the function explanation area 301B is referred to as a "function explanation screen" and denoted by the reference sign "311B."

The function explanation screen 311B includes an image with which a control function indicated by a corresponding icon AC can be intuitively recognized, a text related to the control function indicated by the icon AC, and an operation button.

For example, in FIG. 3, a case in which the control icon AC-T indicating the copy function is selected from the icon group ACG is illustrated. In this case, the function explanation screen 311B related to the copy function of the control app 120B is displayed in the function explanation area 301B. The function explanation screen 311B related to the copy function of the control app 120B includes an image with which the copy function can be intuitively recognized, a text indicating a name of the copy function and settings of the copy function, an execution button JB used for instructing execution of the copy function, a setting change button SHB used for changing the settings of the copy function, and a copy number change button MHB used for changing a setting of the number of copies. When the execution button JB is operated by a touch operation by the user in the function explanation screen 311B, the control app execution section 1110 generates control data that causes the multifunctional machine 2 to execute copying and transmits the control data to the multifunctional machine 2 by the terminal communication unit 12. When the setting change button SHB is operated by a touch operation by the user in the function explanation screen 311B, the control app execution section 1110 causes the touch panel 13 to display a UI used for changing the settings of the copy function. When the copy number change button MHB is operated by a touch operation by the user in the function explanation screen 311B, the control app execution section 1110 causes the touch panel 13 to display a UI used for changing the number of copies.

Figure 6:
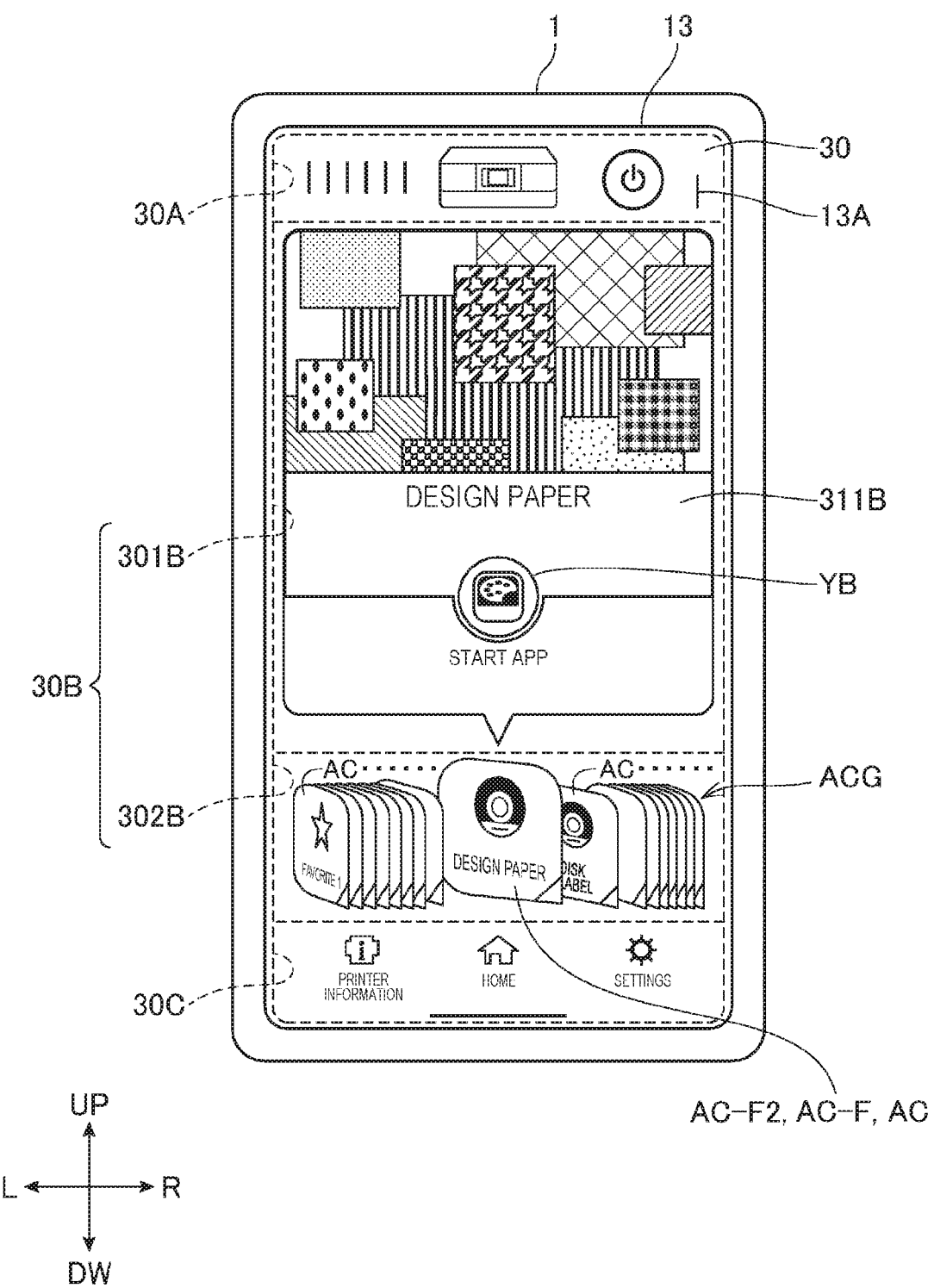
FIG. 6 is a view illustrating an example of the control app UI.

FIG. 6 is a view illustrating an example of the control app UI 30. The control app UI 30 illustrated in FIG. 6 illustrates a UI when the second multifunctional machine icon AC-F2 is selected by a tap operation by the user.

In FIG. 6, similar to FIG. 3, a direction toward an upper side is referred to as "up" and denoted by the reference sign UP, a direction toward a lower side is referred to as "down" and denoted by a reference sign DW, a direction toward a left side is referred to as "left" and denoted by a reference sign L, and a direction toward a right side is referred to as "right" and denoted by a reference sign R.

In the function explanation area 301B illustrated in FIG. 6, the function explanation screen 311B related to the design paper print function of the second multifunctional machine app 120D is displayed. The function explanation screen 311B related to the design paper print function includes an image with which the design paper print function can be intuitively recognized, a text indicating a name of the design paper print function, and a call button YB used for calling the design paper print function of the second multifunctional machine app 120D. When the call button YB is operated by a touch operation by the user in the function explanation screen 311B, the control app execution section 1110 calls and starts the second multifunctional machine app 120D. Thus, the terminal control unit 10 functions as the second multifunctional machine execution section 1130. Then, the second multifunctional machine execution section 1130 displays a UI used for executing the design paper print function via the touch panel 13.

As illustrated in FIG. 3 and FIG. 6, the function explanation screen 311B corresponding to an icon AC selected in the function explanation area 301B is displayed in the function explanation area 301B. That is, when the icon AC selected in the icon display area 302B is the control icon AC-T, the function explanation screen 311B including the execution button JB used for executing the control function indicted by the control icon AC-T is displayed in the function explanation area 301B. When the icon AC selected in the icon display area 302B is the multifunctional machine icon AC-F, the function explanation screen 311B including the call button YB used for calling the control function of the multifunctional machine app 120E is displayed in the function explanation area 301B.

Next, an operation of the terminal 1 in which the control app 120B and the multifunctional machine app 120E are installed is described by describing the control app execution section 1110 and the multifunctional machine app execution section 1140.

Figure 7:
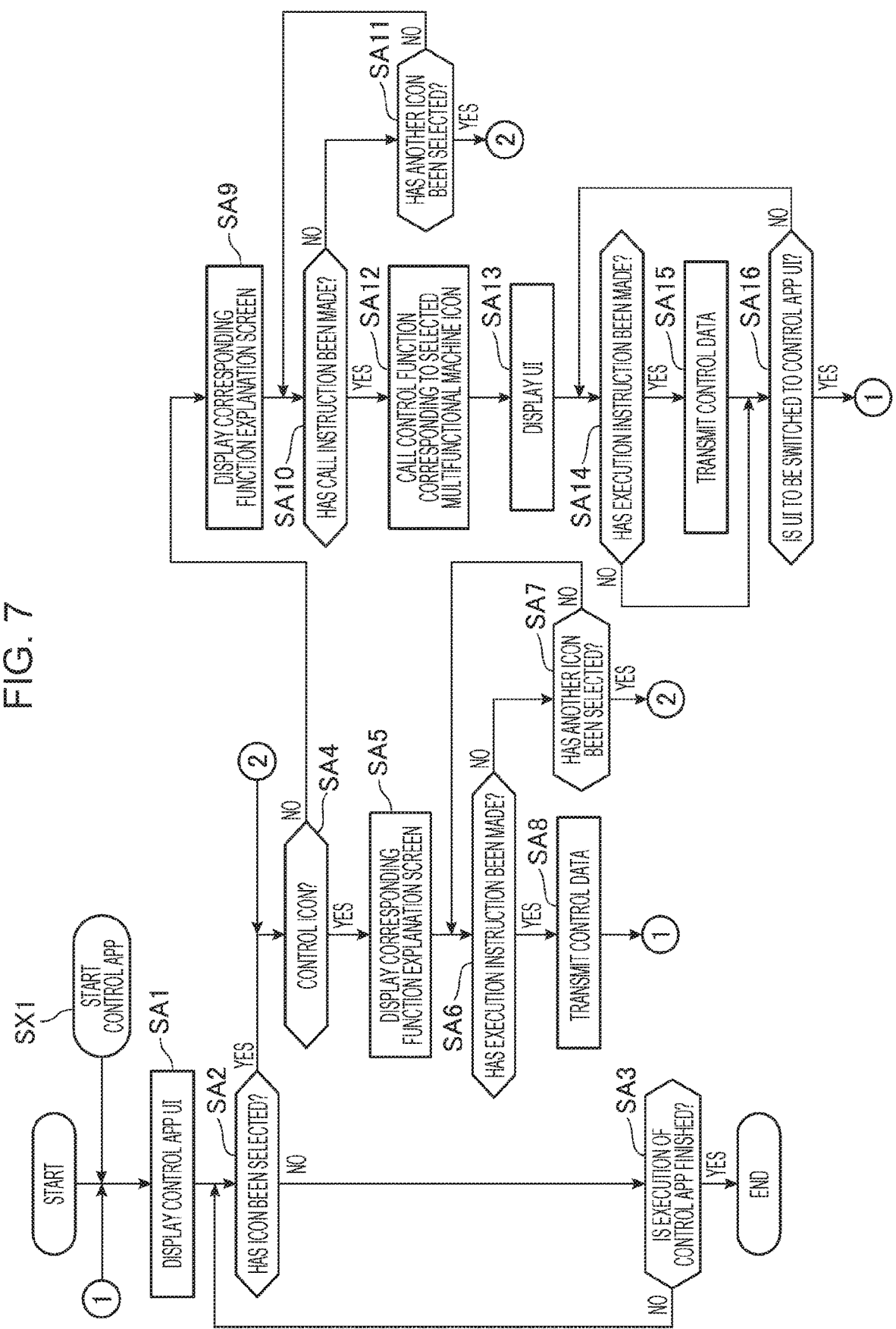
FIG. 7 is a flowchart illustrating an operation of the terminal.

FIG. 7 is a flowchart illustrating the operation of the terminal 1. With reference to FIG. 7, processing performed by the control program 120A, not by the control app 120B and the multifunctional machine app 120E, is described using "the terminal control unit 10" as an agent of the processing in corresponding sentences.

The user operates the touch panel 13 of the terminal 1 to start the control app 120B (Step SX1).

When the control app 120B is started, the terminal control unit 10 functions as the control app execution section 1110 and the control app execution section 1110 causes the touch panel 13 to display the control app UI 30 (Step SA1).

Next, the control app execution section 1110 determines, based on an input from the touch panel 13, whether an icon AC has been selected from the icon group ACG in the icon display area 302B (Step SA2).

When the control app execution section 1110 determines that an icon AC has not been selected from the icon group ACG (NO in Step SA2), the control app execution section 1110 determines whether execution of the control app 120B is to be terminated (Step SA3).

When the control app execution section 1110 determines that execution of the control app 120B is to be terminated (YES in Step SA3), this processing is terminated. For example, a button used for instructing to terminate execution of the control app 120B is provided in the control app UI 30 and, when the button is operated by a touch operation, the control app execution section 1110 makes an affirmative determination in step SA3.

When the control app execution section 1110 determines that execution of the control app 120B is not to be terminated (NO in Step SA3), the control app execution section 1110 causes the process to return to Step SA2.

Returning to the description of Step SA2, when the control app execution section 1110 determines that an icon AC has been selected from the icon group ACG (YES in Step SA2), the control app execution section 1110 determines whether the selected icon AC is a control icon AC-T (Step SA4).

When the control app execution section 1110 determines that the selected icon AC is a control icon AC-T (YES in Step SA4), the control app execution section 1110 displays the function explanation screen 311B corresponding to the selected control icon AC-T in the function explanation area 301B of the control app UI 30 (Step SA5).

Next, the control app execution section 1110 determines whether an execution instruction for a control function indicated by the selected control icon AC-T has been made (Step SA6). When the execution button JB included in the function explanation screen 311B is operated by a touch operation, the control app execution section 1110 makes an affirmative determination in Step SA6.

When the control app execution section 1110 determines that an execution instruction for the control function indicated by the selected control icon AC-T has not been made (NO in Step SA6), the control app execution section 1110 determines whether another icon AC has been selected from the icon group ACG displayed in the icon display area 302B (Step SA7).

When control app execution section 1110 determines that another icon AC has not been selected from the icon group ACG (NO in Step SA7), the control app execution section 1110 causes the process to return to Step SA6 and executes processing of Step SA6 again. On the other hand, when the control app execution section 1110 determines that another icon AC has been selected from the icon group ACG (YES in Step SA7), the process returns Step SA4.

Returning to the description of Step SA6, when the control app execution section 1110 determines that an execution instruction for the control function indicated by the selected control icon AC-T has been made (YES in Step SA6), the control app execution section 1110 transmits control data that causes execution of processing corresponding to the control function for which the execution instruction has been made to the multifunctional machine 2 by the terminal communication unit 12 (Step SA8).

Thus, the multifunctional machine 2 executes processing corresponding to the control function indicted by the selected control icon AC-T, based on the received control data. For example, when the execution button JB is operated by a touch operation in the control app UI 30 illustrated in FIG. 3, the control app execution section 1110 transmits control data that causes execution of copying to the multifunctional machine 2. Thus, the multifunctional machine 2 executes copying by the printing unit 24.

Next, the control app execution section 1110 stops displaying the function explanation screen 311B in the function explanation area 301B and causes the touch panel 13 to display the control app UI 30 in which the function explanation screen 311B is not displayed again (Step SA1).

Returning to the description to Step SA4, when the control app execution section 1110 determines that the selected icon AC is not the control icon AC-T (NO in Step SA4), that is, when the control app execution section 1110 determines that the selected icon AC is a multifunctional machine icon AC-F, the control app execution section 1110 displays the function explanation screen 311B corresponding to the selected multifunctional machine icon AC-F in the function explanation area 301B of the control app UI 30 (Step SA9).

Next, the control app execution section 1110 determines whether a call instruction for the multifunctional machine app 120E having a control function indicted by the selected multifunctional machine icon AC-F has been made (Step SA10). When the call button YB included in the function explanation screen 311B is operated by a touch operation, the control app execution section 1110 makes an affirmative determination in Step SA10.

When the control app execution section 1110 determines that the call instruction has not been made (NO in Step SA10), the control app execution section 1110 determines whether another icon AC has been selected from the icon group ACG (Step SA11).

When the control app execution section 1110 determines that another icon AC has not been selected from the icon group ACG (NO in Step SA11), the control app execution section 1110 causes the process to return to Step SA10 and causes execution of processing of Step SA10 again. On the other hand, when the control app execution section 1110 determines that another icon AC has been selected from the icon group ACG (YES in Step SA11), the control app execution section 1110 causes the process to return to Step SA4.

Returning to the description of Step SA10, when the control app execution section 1110 determines that the call instruction has been made (YES in Step SA10), the control app execution section 1110 calls the control function that is the control function of the multifunctional machine app 120E and corresponds to the selected multifunctional machine icon AC-F (Step SA12).

When the control app execution section 1110 calls the control function of the multifunctional machine app 120E, the multifunctional machine app 120E is started and the terminal control unit 10 functions as the multifunctional machine app execution section 1140. Then, the multifunctional machine app execution section 1140 causes the touch panel 13 to display a UI used for executing the control function indicated by the selected multifunctional machine icon AC-F (Step SA13). In the following description, the UI that the multifunctional machine app execution section 1140 causes the touch panel 13 to display is referred to as a multifunctional machine app UI.

Next, the multifunctional machine app execution section 1140 determines whether an execution instruction for the control function has been made (Step SA14). A button used for making an execution instruction for the control function is provided in the multifunctional machine app UI and, when the button is operated, the multifunctional machine app execution section 1140 makes an affirmative determination in Step SA14.

When the multifunctional machine app execution section 1140 determines an execution instruction for the control function has not been made (NO in Step SA14), the multifunctional machine app execution section 1140 causes the process to proceed to Step SA16.

On the other hand, when the multifunctional machine app execution section 1140 determines that an execution instruction for the control function (YES in Step SA14), the multifunctional machine app execution section 1140 transmits control data that causes execution of processing corresponding to the control function to the multifunctional machine 2 (Step SA15).

For example, when the call button YB is operated by a touch operation in the control app UI 30 illustrated in FIG. 6, the second multifunctional machine execution section 1130 causes the touch panel 13 to display the multifunctional machine app UI used for executing the design paper print function. Then, when an execution instruction is made in the UI, the second multifunctional machine execution section 1130 transmits control data that causes execution of design paper printing to the multifunctional machine 2 by the terminal communication unit 12. Thus, the multifunctional machine 2 executes design paper printing by the printing unit 24.

Next, the terminal control unit 10 determines whether the UI displayed on the touch panel 13 is to be switched from the multifunctional machine app UI to the control app UI 30 (Step SA16). For example, when an input indicating a switching operation from the switch unit 14, the touch panel 13, or the like, the terminal control unit 10 makes an affirmative determination in Step SA16.

When the terminal control unit 10 determines that the UI displayed on the touch panel 13 is not to be switched from the multifunctional machine app UI to the control app UI 30 (NO in Step SA16), the terminal control unit 10 causes the process to return to Step SA14. That is, the multifunctional machine app execution section 1140 continues to display the multifunctional machine app UI on the touch panel 13 and determines whether an execution instruction for the control function has been made again.

On the other hand, when the terminal control unit 10 determines that the UI displayed on the touch panel 13 is to be switched from the multifunctional machine app UI to the control app UI 30 (YES Step SA16), the terminal control unit 10 causes the process to return to Step SA1. That is, the control app execution section 1110 causes the touch panel 13 to display the control app UI 30 in which the function explanation screen 311B is not displayed on the touch panel 13.

Next, modified examples of the above described embodiment are described.

First Modified Example

In a first modified example, as compared to the above described embodiment, processing of Step SA15 and subsequent steps are different. In the above described embodiment, the UI displayed on the touch panel 13 is switched from the multifunctional machine app UI to the control app UI 30 by a switching operation of switching the UI to the control app UI 30. In the first modified example, when the multifunctional machine app execution section 1140 transmits the control data to the multifunctional machine 2, the UI displayed on the touch panel 13 is automatically switched from the multifunctional machine app UI to the control app UI 30. According to the first modified example, time and effort of the user in switching the UI from the multifunctional machine app UI to the control app UI 30 are not required, and therefore, convenience when the control app 120B is used again after the multifunctional machine app 120E is used is increased.

Second Modified Example

In a second modified example, as compared to the above described embodiment, processing of Step SA15 and subsequent steps are different. In the second modified example, when the multifunctional machine app execution section 1140 transmits control data to the multifunctional machine 2, whether the UI displayed on the touch panel 13 is to be kept to be the multifunctional machine app UI or is to be switched to the control app UI 30 is asked to the user. This inquiry function may be a function of the multifunctional machine app 120E and may be a function of the control app 120B. However, when the inquiry function is a function of the control app 120B, the multifunctional machine app 120E notifies the control app 120B that transmission of the control data is completed. In response to an inquiry, when an operation in which the UI displayed on the touch panel 13 is kept to be the multifunctional machine app UI is detected, the terminal 1 keeps displaying the multifunctional machine app UI without switching the UI. On the other hand, in response to the inquiry, when an operation in which the UI displayed on the touch panel 13 is switched to the control app UI 30 is detected, the terminal 1 switches the UI from the multifunctional machine app UI to the control app UI 30. According to the second modified example, the UI is not automatically switched to the control app UI 30, and therefore, UI display reflecting an intension of the user can be performed, thereby increasing convenience.

Third Modified Example

The above described icon group ACG has a configuration in which, without depending on a type of the multifunctional machine 2 that communicates with the terminal 1, the icon group ACG including the same icons is displayed in the icon display area 302B. In a third modified example, the icon group ACG including a plurality of icons AC in accordance with the type of the multifunctional machine 2 that communicates with the terminal 1 is displayed in the icon display area 302B.

For example, when the multifunctional machine 2 does not include the scanning unit 25 and the multifunctional machine 2 cannot execute scanning, the control app execution section 1110 displays the icon group ACG that does not include a multifunctional machine icon AC-F1 indicating the scan function in the icon display area 302B. For example, when the multifunctional machine 2 does not have a component used for performing printing on a label surface of a disk, the control app execution section 1110 displays the icon group ACG that does not include a multifunctional machine icon AC-F2 indicating the disk label print function in the icon display area 302B.

In the third modified example, for example, the control app execution section 1110 displays a UI used for inputting information, such as a model number or the like, that specifies the type of the multifunctional machine 2 by the touch panel 13 when the control app 120B is started for the first time after the control app 120B is installed. Then, the control app execution section 1110 acquires list information of control functions corresponding the type of the multifunctional machine 2 from a predetermined device coupled to the global network GN, based on the model number or the like of the multifunctional machine 2 which has been input to the corresponding UI. The control app execution section 1110 selects icons AC indicating control functions that match the acquired list information and displays the icon group ACG formed by the selected icons AC in the icon display area 302B.

For example, in the above described configuration, when the control app 120B is started for the first time after the control app 120B is installed in the terminal 1, the control app execution section 1110 communicates with the multifunctional machine 2 and acquires the list information of the corresponding control functions from the multifunctional machine 2. Then, the control app execution section 1110 selects icons AC indicating control functions that match the acquired list information and displays an icon group ACG formed by the selected icons AC in the icon display area 302B.

According to the third modified example, the plurality of icons AC corresponding to the type of the multifunctional machine 2 are displayed in the icon display area 302B, and thus, an icon AC indicating a control function that does not correspond to the multifunctional machine 2 is not displayed in the icon display area 302B. Therefore, occurrence of a situation in which, even when the user selects an icon AC and gives an execution instruction for processing to the multifunctional machine 2, the multifunctional machine 2 does not execute the processing can be reliably prevented.

Fourth Modified Example

In a fourth modified example, a predetermined mark is given to each of icons AC that are displayed in the icon display area 302B. Marks in different forms may be given to the control icon AC-T, the first multifunctional machine icon AC-F1, and the second multifunctional machine icon AC-F2, and marks in different forms may be given to the icons AC in accordance with types of control functions. According to the fourth modified example, the user can intuitively recognize what kind of icons AC are displayed in the icon display area 302B by the marks given to the icons AC. Therefore, in the fourth modified example, the terminal 1 can display icons in a more user-friendly manner.

As has been described above, the terminal 1 that can communicate with the multifunctional machine 2 includes the touch panel 13 and the terminal control unit 10 that causes, by execution of the control app 120B, the touch panel 13 to display a plurality of icons AC including a multifunctional machine icon AC-F indicating a control function of the multifunctional machine app 120E such that the icons AC are arranged in a line and, when an icon AC selected by a selection operation is the multifunctional machine icon AC-F, calls the multifunctional machine app 120E. The terminal control unit 10 causes the touch panel 13 to display the plurality of icons AC such that portions of adjacent ones of the icons AC are superimposed on each other.

That is, the terminal 1 causes the touch panel 13 to display the plurality of icons AC including the multifunctional machine icon AC-F such that the icons AC are arranged in a line and portions of adjacent ones of the icons AC are superimposed on each other and receives a selection operation performed on the displayed icons AC. When one of the multifunctional machine icons AC-F is selected by the selection operation, the terminal control unit 10 calls a corresponding function of the multifunctional machine app 120E to the selected multifunctional machine icon AC-F. Specifically, the control app 120B starts the multifunctional machine app 120E corresponding to the selected multifunctional machine icon AC-F and causes the multifunctional machine app 120E to display a screen used for using a control function corresponding to the selected multifunctional machine icon AC-F. As used herein, "the screen used for using the control function" is a multifunctional machine app UI corresponding to the selected multifunctional machine icon AC-F.

According to the terminal 1 of this embodiment described above, portions of adjacent ones of the icons AC are superimposed on each other, and therefore, even when many icons AC corresponding to the number of multifunctional machine apps 120E installed in the terminal 1 and the number of control functions of the multifunctional machine apps 120E are displayed, increase in the display area in which the icons AC are displayed to a wide area can be suppressed. Therefore, the user can easily find a desired icon AC. Moreover, increase in the display area in which the icons AC are displayed to a wide area can be suppressed, and therefore, the user can easily know where in the display area of the icons AC the desired icon AC is located. Therefore, the terminal 1 that displays the icons AC including the multifunctional machine icon AC-F can display the icons in a user-friendly manner.

The terminal control unit 10 causes the touch panel 13 to display the plurality of icons AC in a mode in which each of the plurality of icons AC is obliquely inclined with respect to the arrangement direction NY of the icons AC.

According to this configuration, an area used for displaying one icon AC can be reduced and increase in the display area in which the plurality of icons AC are displayed to a wide area can be further suppressed. Therefore, the icons can be displayed in a more user-friendly manner.

The control app 120B has a control function. A plurality of icons AC displayed on the touch panel 13 include a control icon AC-T.

According to this configuration, even when the plurality of icons AC including the multifunctional machine icon AC-F and the control icon AC-T are displayed, increase in the display area in which the icons AC are displayed to a wide area can be suppressed. Therefore, even when the plurality of icons AC displayed by the terminal 1 include the control icon AC-T, the icons can be displayed in a user-friendly manner.

The terminal control unit 10 causes the touch panel 13 to display the plurality of icons AC corresponding to the type of the multifunctional machine 2 that communicates with the terminal 1.

According to this configuration, the plurality of icons AC corresponding to the type of the multifunctional machine 2 are displayed in the icon display area 302B, and thus, an icon AC indicating a control function that does not correspond to the multifunctional machine 2 is not displayed in the icon display area 302B. Therefore, occurrence of a situation in which, even when the user selects an icon AC and gives an execution instruction for processing to the multifunctional machine 2, the multifunctional machine 2 does not execute processing can be prevented.

The above described embodiment and modified examples are merely examples of the present disclosure, and any modification and application can be made without departing from the scope of the present disclosure.

For example, in the above described embodiment and modified examples, the terminal 1 is described as an example of the terminal device. However, the terminal device is not limited to a tablet type device but may be a desktop-type device or a laptop-type device.

For example, in the above described embodiment, in the icon display area 302B, the control icon AC-T, the first multifunctional machine icon AC-F1, and the second multifunctional machine icon AC-F2 are arranged in this order from left to right. However, an order in which the icons AC are arranged is not limited thereto and the icons AC may be arranged in any order.

For example, in the above described embodiment and modified examples, a configuration in which the control app 120B has the copy function as a control function has been described as an example. However, the control function of the control app 120B may be another function and the control app 120B may have more functions. Similar applies to the first multifunctional machine app 120C and the second multifunctional machine app 120D. However, icons AC corresponding to control functions of apps are displayed in the icon display area 302B.

For example, in the above described embodiment and modified examples, a case in which the control app 120B can call two multifunctional machine apps 120E has been described as an example. However, the number of the multifunctional machine apps 120E that can be called is not particularly limited and may be more and less than two. However, icons AC in accordance with the number of callable apps are displayed in the icon display area 302B.

For example, in the above described embodiment and modified examples, a case in which the multifunctional machine 2 includes a serial-type ink jet head has been described as an example. However, the multifunctional machine 2 may include a line-type ink jet head. A print method of the multifunctional machine 2 is not limited to an ink jet method and may be some other print method, such as a thermal method. As a printing device according to the present disclosure, the multifunctional machine 2 has been described as an example. However, the printing device according to the present disclosure is not limited to the multifunctional machine 2 and may be a printing device, such as a printer or the like, that does not execute scanning. Moreover, the multifunctional machine 2 may be a device having various functions, such as a facsimile function or the like.

For example, the control app execution section 1110 may be configured to, when the call button YB is operated by a touch operation in a state in which the multifunctional machine app 120E that can be called is not installed, cause the touch panel 13 to display a screen used for installing the multifunctional machine app 120E.

The functions of the terminal control unit 10 and the multifunctional machine control unit 20 may be realized by a plurality of processors or semiconductor chips.

Each unit illustrated in FIG. 2 is merely an example and a specific embodiment thereof is not particularly limited thereto. That is, a hardware independently corresponding to each unit is not necessarily needed to be mounted, and a configuration in which a function of each unit is realized by executing a program by one processor may be of course employed. A portion of a function that is realized by a software in the above described embodiment may be a hardware, or a portion of a function that is realized by a hardware may be realized by a software. In addition, any change can be made to specific detailed components of each unit other than the terminal 1 and the multifunctional machine 2 without departing from the gist of the present disclosure.

For example, in order to make the operation of the terminal 1 easily understood, the operation illustrated in FIG. 7 is divided into step units as illustrated in FIG. 7 in accordance with main process contents. The present disclosure is not limited by how processing is divided into process units or names of the process units. In accordance with the process contents, the operation may be divided into even more step units. The operation may be divided such that one step unit includes more processes. Moreover, an order of the steps may be changed as appropriate without departing from the spirit of the present disclosure.

What is claimed is:

1. A terminal device configured to communicate with a printing device, the terminal device comprising:
   a display unit; and
   a control unit configured to, by execution of a first application, cause the display unit to display a plurality of icons including a first icon indicating a function of a second application which causes the printing device to execute processing such that the icons are arranged in a line and, when an icon selected by a selection operation from the icons is the first icon, call the function of the second application which corresponds to the first icon, wherein
   the control unit causes the display unit to display the plurality of icons such that a part of one icon of the icons is superimposed on the other icon adjacent to the one icon.

2. The terminal device according to claim 1, wherein
   the control unit causes the display unit to display the plurality of icons in a mode in which each of the plurality of icons is obliquely inclined with respect to an arrangement direction of the icons.

3. The terminal device according to claim 1, wherein
   the first application has the function, and
   the plurality of icons include a second icon indicating the function of the first application.

4. The terminal device according to claim 1, wherein
   the control unit causes the display unit to display the plurality of icons corresponding to a type of the printing device that communicates with the terminal device.

5. A method for controlling a terminal device that includes a display device and that is configured to communicate with a printing device, the method comprising:
   by execution of a first application,
   causing the display unit to display a plurality of icons including a first icon indicating a function of a second application which causes the printing device to execute processing such that the icons are arranged in a line and a part of one icon of the icons is superimposed on the other icon adjacent to the one icon; and
   calling, when an icon selected by a selection operation from the icons is the first icon, the function of the second application which corresponds to the first icon.

6. A non-transitory computer-recordable storage medium storing a program that is executed by a control unit of a terminal device that includes a display unit and that is configured to communicate with a printing device, the program comprising:
   causing the control unit to
      cause the display unit to display a plurality of icons including a first icon indicating a function of an application which causes the printing device to execute processing such that the icons are arranged in a line and a part of one icon of the icons is superimposed on the other icon adjacent to the one icon, and
      call, when an icon selected by a selection operation from the icons is the first icon, the function of the application which corresponds to the first icon.

* * * * *